Nov. 29, 1955 — O. VORGANG — 2,725,462

SPECTACLES HAVING LAMP ATTACHMENT

Filed Aug. 9, 1952 — 2 Sheets-Sheet 1

INVENTOR.
Otto Vorgang

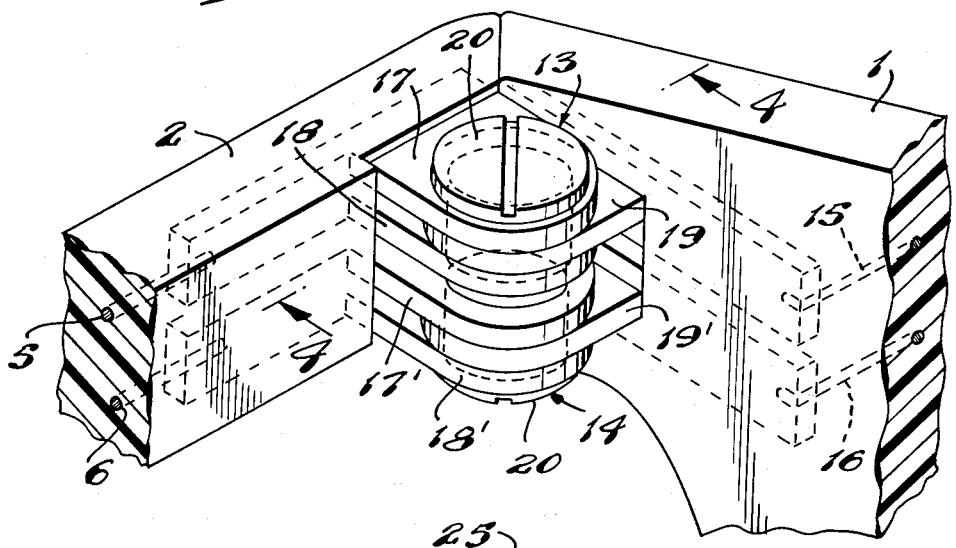
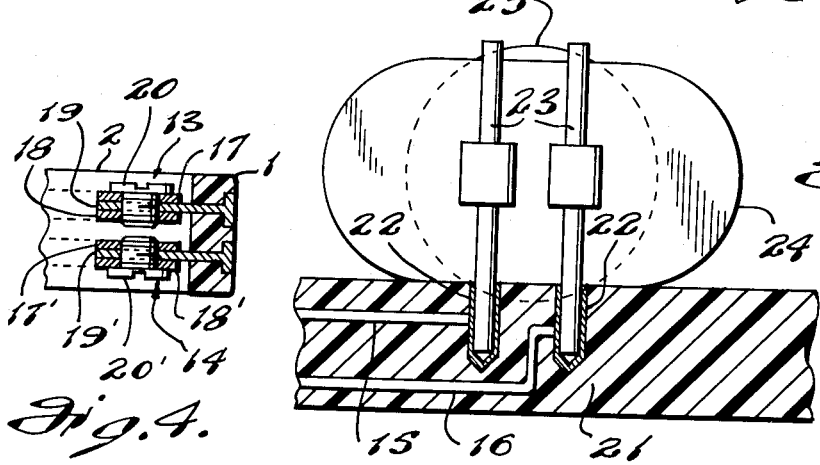
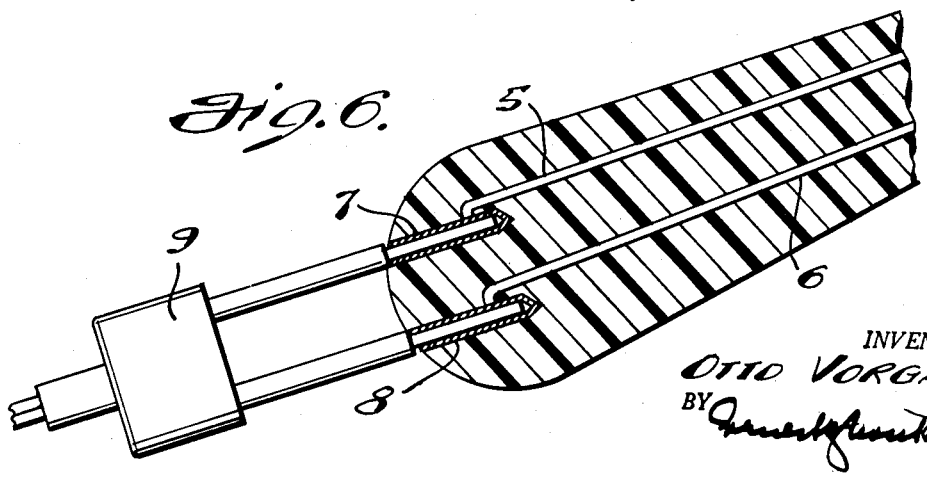

United States Patent Office 2,725,462
Patented Nov. 29, 1955

2,725,462
SPECTACLES HAVING LAMP ATTACHMENT

Otto Vorgang, New York, N. Y., assignor of one-half to Rudolf Morgenstern, New York, N. Y.

Application August 9, 1952, Serial No. 303,584

2 Claims. (Cl. 240—2)

The present invention relates to spectacles having a lamp attachment, and in particular to an attachment removable from the spectacle frames, the attachment being designed for the purpose of supporting an instrumentality such as a headlamp or the like.

Spectacles are known which have been equipped with a lamp attachment, which, however, had an outside wiring merely clamped to the spectacle frames or, if feeding through the temples and the frames, provided difficulties in maintaining a closed circuit, since this circuit was closed only if proper contact was provided between the engaging faces of the temples and the corresponding spectacle frames.

It is one of the objects of the present invention to provide spectacles having a lamp attachment which assures permanently a closed circuit, if desired, regardless of the position of the temples relative to the spectacle frames, despite the fact that the conduits are embedded in the temples and in at least one of the spectacle frames.

It is another object of the present invention to provide spectacles having an attachment, the attachment being removably secured to spectacle frames of usual construction, the device being so constructed and arranged that a headlamp or similar instrument may be supported thereby in a manner which will position the lamp substantially over the bridge portion of the spectacle frame directly between the eyes of a wearer of the frame.

It is still another object of the present invention to provide spectacles which have an attachment to carry a headlamp substantially on the bridge member of the spectacle frames, the conduits for the headlamp being embedded in the temples and in at least one of the spectacle frames, and at least one of the hinges connecting the temples with the spectacle frames being made of two separate parts to function as electrical connecting means between the respective conduits embedded in the temples and the spectacle frames.

With these and other objects in view which will become apparent in the following detailed description, the present invention will be clearly understood in connection with the accompanying drawings, in which:

Fig. 3 is a perspective front view of the specific hinge connecting one of the temples with the corresponding spectacle frame, shown on an enlarged scale;

Fig. 4 is a section along the lines 4—4 of Fig. 3;

Fig. 5 is a fragmentary view of the attachment inserted into the bridge member of the spectacle frames; and Fig. 6 is a fragmentary end view of one of the temples showing the conduit connection.

Figure 2:
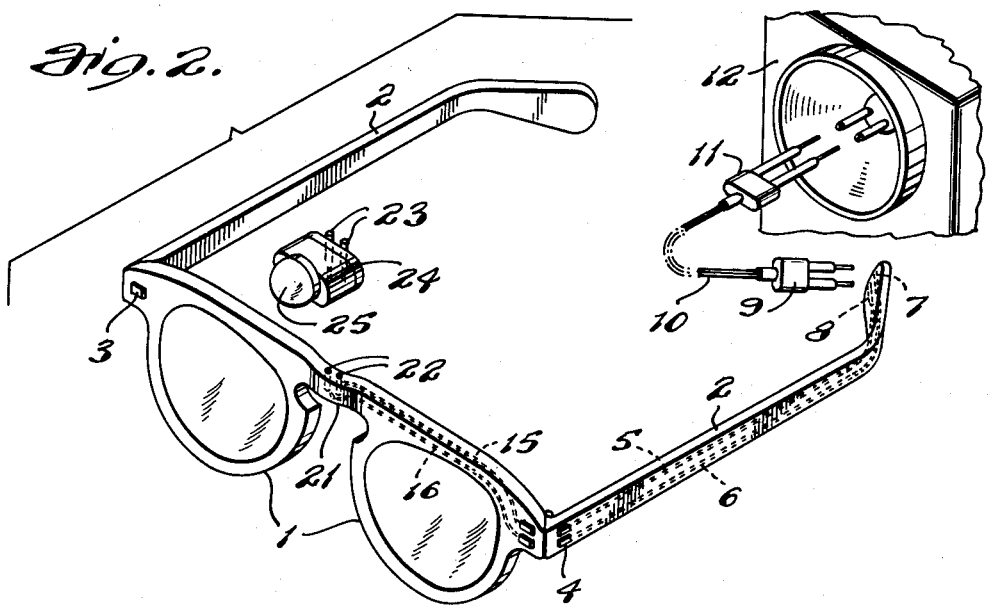
Fig. 2 is a perspective exploded top view of the spectacles with the attachment.
Figure 1:
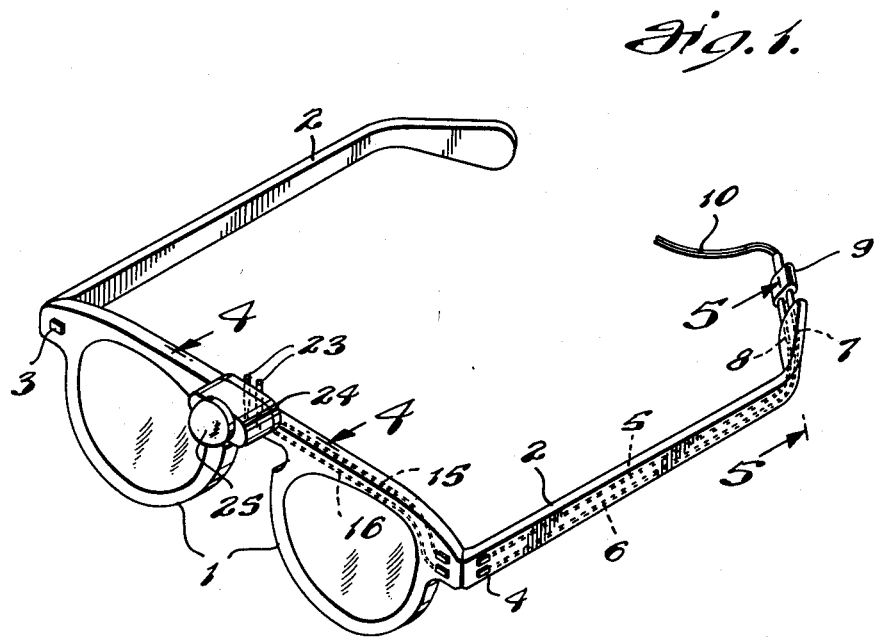
Figure 1 is a respective top view of the spectacles with the attachment.

Referring now to the drawings, the present device comprises spectacles of usual construction consisting of a pair of frames 1 to which temples 2 are connected by means of hinges 3 and 4, respectively.

Embedded into one of the temples 2 are the lead wires 5 and 6. The latter terminate at the rear end of the temple 2 into plugs 7 and 8 which are adapted to receive a complementary plug member 9 from which a cord 10 leads to another plug member 11 for electrical connection with an electric source. This electric source may be an electric battery 12, shown by example in Fig. 2, although it is to be understood that any other proper electrical source may be used as a plug to receive house current which is equipped with a transformer (not shown) to transform the normal house voltage of 120 volts to a low voltage used in low-voltage lamps.

The front ends of the lead wires 5 and 6 terminate into separate hinge portions 13 and 14, respectively, of the specially designed hinge 4.

Since the hinge portions 13 and 14 of the hinge 4 function as electrical connecting means between the lead wires 5, 6 embedded in one of the temples 2, and the lead wires 15 and 16 embedded in one of the spectacle frames, each of the portions 13 and 14 must be secured to the temple and spectacle frame, respectively, in such manner that they are insulated from each other. In order to achieve this end the hinge portion 13 comprises the plates 17 and 18 secured to the temple 2, between which plates 17 and 18 the plate 19, secured to the spectacle frame 1, is disposed. A screw bolt 20 retains the respective plates 17, 18 and 19 in hinge position. Thus the upper portion 13 of the hinge 4 provides the electrical connection of the lead wires 5 and 15 regardless of the position of the temple 2 relative to the spectacle frame 1. The lower hinge portion 14 consists of equivalent plates 17' and 18' secured to the temple 2 between which the plate 19' is disposed and held by the screw bolt 20', the inner ends of both screw bolts 20 and 20' being spaced apart from each other so as to avoid any electrical contact. Proper connection between the plates 17, 18 and 17', 18' by soldering or other suitable means are provided with the terminals 5 and 6, respectively, and in the same manner proper connections are provided between the plates 19 and 19' to the respective terminals of the lead wires 15 and 16.

The lead wires 15 and 16 are, as stated above, embedded in one of the spectacle frames 1 and extend into the bridge member 21 of the latter. The bridge member 21 is equipped with preferably vertically disposed socket openings 22 which are adapted to receive complementary plug pins 23 of an attachment member 24, which is designed to form a socket, to receive an electric bulb 25.

If the spectacles are used in daylight, and no artificial light is required, the attachment 24 can easily be removed from the socket openings 22, and likewise the plug member 9 can easily be removed from the sockets 7 and 8, so that the spectacles lend themselves for use as any conventional spectacle frame. If, however, the spectacles are used at night time or required for special illumination for a particular purpose, the attachment 24 will be inserted into the socket openings 22 and the plug 9 connected with the corresponding members 7 and 8 at the rear end of the temple 2, and upon further connecting the other end of the cord either to a battery or to any other convenient source, the operation of a switch will bring about the lightening of the bulb 25 and thereby permit of the use of the spectacles with an electric lamp secured in the attachment 24.

Since it is often experienced that in the use of spectacles the temples 2 will assume the outermost position, the specially constructed hinge 4, operating as electrical connecting means for the respective lead wires 5, 6 and 15, 16, assures a permanent closed circuit and a proper operation of the electric bulb 25.

While I have disclosed one embodiment of the present invention, it is to be understood that this embodiment is

I claim:

1. Spectacles having a lamp attachment comprising a pair of spectacle frames, temples, hinge means disposed between the front end of said temples and the outer side of the said frames to provide a hinge connection between the same, a bridge member connecting the said pair of frames, means for removably connecting an electric lamp attachment to the said bridge member, a first pair of lead wires embedded in the said bridge member and one of the said frames, a second pair of lead wires embedded throughout the entire length of one of the said temples, one of the said hinge means comprising two separate conducting portions secured to the said one of the frames and the said one of the temples, said portions being spaced apart from each other, so that each of the said portions of the said one hinge means is insulated from the other, the terminals of one of the said first and second pairs of lead wires being electrically connected to one of the said hinge portions, and the terminals of the other of the said first and second pairs of lead wires being electrically connected to the other of the said hinge portions, so that each of the said hinge portions functions as an electrical conductor between the corresponding lead wires of the said first and second pairs of lead wires, and connects permanently the respective lead wires of the said bridge member and the said temples.

2. The spectacles, as set forth in claim 1, in which the said means for removably connecting an electric lamp attachment to the said bridge member comprises a socket member having openings, the said electric lamp attachment having corresponding plug pins received by the said openings of the socket member, and the inner terminals of the said first pair of lead wires being electrically connected with the said socket member, thereby permitting of easy removal of the lamp attachment from the said bridge member.

References Cited in the file of this patent

UNITED STATES PATENTS

| | | |
|---|---|---|
| 463,420 | Gartland | Nov. 17, 1891 |
| 531,515 | Davis | Dec. 25, 1894 |
| 1,977,105 | Wood | Oct. 16, 1934 |

FOREIGN PATENTS

| | | |
|---|---|---|
| 491,677 | Great Britain | Sept. 7, 1938 |
| 801,975 | France | May 30, 1936 |